United States Patent [19]

Dobrzynski

[11] Patent Number: 5,096,383

[45] Date of Patent: * Mar. 17, 1992

[54] PROPELLER BLADES

[75] Inventor: Werner M. Dobrzynski, Wolfenbüttel, Fed. Rep. of Germany

[73] Assignee: Deutsche Forschungsanstalt für Luft- und Raumfahrt e.V., Cologne, Fed. Rep. of Germany

[*] Notice: The portion of the term of this patent subsequent to Nov. 19, 2008 has been disclaimed.

[21] Appl. No.: 549,604

[22] Filed: Jul. 9, 1990

Related U.S. Application Data

[63] Continuation-in-part of Ser. No. 259,854, Oct. 19, 1988, abandoned.

Foreign Application Priority Data

[30]

Nov. 2, 1989 [DE] Fed. Rep. of Germany ....... 3936428

[51] Int. Cl.[5] .............................................. B64C 11/48
[52] U.S. Cl. ................. 416/200 R; 416/124; 416/127
[58] Field of Search ....... 416/200 R, 100 A, 124–127; 415/119

[56] References Cited

U.S. PATENT DOCUMENTS 1,868,008  7/1932  Gardner ............................. 415/119
4,514,146  4/1985  Nojiri et al. .................... 416/200 R Primary Examiner—John T. Kwon
Attorney, Agent, or Firm—Gottlieb, Rackman & Reisman

[57] ABSTRACT

A propeller for an aircraft or fan comprises an even number of propeller blades, at least six in number, which are unsymmetrically arranged around the axis of roation of the propeller in two circumferentially equidistantly spaced groups of at least three blades each. Each blade of each group is paired and longitudinally aligned with a respective blade of another group at the opposite side of the axis of rotation of the propeller, and each two next adjacent blades in each group are offset relative to each other by a spacing angle of between about 15° and 40°. For a selected speed of rotation of the propeller corresponding to a particular blade-tip Mach number, the magnitude of the spacing angle is inversely related to the magnitude of that blade-tip Mach number, for effecting a reduction of the level of the rotational sound harmonics by interference.

6 Claims, 6 Drawing Sheets

PROPELLER BLADES

RELATED APPLICATION

This application is a continuation-in-part of copending prior U.S. patent application Ser. No. 259,854 filed Oct. 19, 1988 now abandoned. The entire disclosure of the said prior application is incorporated herein by reference.

BACKGROUND OF THE INVENTION

This invention relates to propellers, and in particular to such propellers which have an even number of propeller blades greater than four disposed in opposite pairs, i.e., with the two blades of each pair being arranged in longitudinal alignment with each other at opposite sides and radially of the axis of rotation of the propeller.

It has long been known that propellers are efficient aircraft propulsors in the low to medium flight speed range, i.e., at cruising speeds below about 300 km/h. In this connection, it has been determined that the noise generated by a propeller-driven aircraft is predominantly propeller noise the level of which depends primarily on the Mach number of the blade tips of the propeller. However, the noise generated by a propeller rotating at a speed corresponding to a blade-tip Mach number in the range of about 0.4 to 0.9 becomes a source of annoyance to people on the ground under the flight path of the aircraft and especially to people living in houses in the vicinity of an airport where the frequency of overflights at times is very high. This has led, of late, to the imposition, by both national and local government agencies, of relatively stringent propeller-aircraft noise certification limits (ICAO ANNEX 16/Chapter 10), which has in turn led to the development and use of "low noise propellers."

Prior to the invention disclosed in the aforesaid application Ser. No. 259,854, a significant propeller noise reduction was attainable only by significantly lowering the helical blade-tip Mach number, which required either reducing the propeller speed of rotation or reducing the lengths of the propeller blades. However, the utilization of these expedients to achieve lower blade-tip Mach numbers entailed rather severe performance penalties, primarily in the form of a loss of propeller thrust. Although steps can be taken to compensate for such loss of thrust, for example, by lengthening the propeller blades as an adjunct to a reduction of their speed of rotation, or by modifying the profiles of the propeller blades or providing them with lift aids as an adjunct to a reduction of the blade length, the requisite aircraft modifications to accommodate the alterations of the propeller and its drive mechanism are quite complicated and very expensive to put into effect.

The basic principle of the invention disclosed in the said prior application Ser. No. 259,854 was that a certain degree of propeller noise reduction can be achieved with the aid of a propeller having an unsymmetrically distributed even number (at least four) of propeller blades which are arranged around the common axis of rotation in opposite pairs, i.e., pairs having the two blades thereof longitudinally aligned with each other (180° apart) and disposed on diametrically opposite sides of the axis of rotation. In the case of a four-bladed propeller, therefore, in which a symmetrical blade spacing would have 90° angles between the circumferentially adjacent blades, the two pairs of blades were described as being offset in relation to one another so as to define therebetween a spacing angle $\epsilon$ of between about 15° and 50°, with the magnitude of the spacing angle selected for any given propeller speed that corresponds to a bladetip Mach number within the 0.4 to 0.9 range being inversely related to the magnitude of the blade-tip Mach number. The effect of this arrangement was a reduction in the level of the rotational sound harmonics by interference, with the noise reduction being on the order of magnitude of up to 4 dB(A).

Physical propeller blade arrangements characterized by plural pairs of longitudinally aligned pairs of blades are per se well known in the art; representative arrangements are shown, for example, in U.S. Pat. Nos. 921,423, 1,073,413, 1,944,525, 2,126,221, 3,023,813, 3,592,559, 3,830,587, 4,483,658 and 4,676,459. The prior art never suggested, however, the provision, for purposes of noise reduction, of a propeller with such paired propeller blades having the pairs of blades offset from one another by a spacing angle the magnitude of which is both within the range of about 15° to 50° and inversely related in a precalculated manner to the magnitude of the propeller blade-tip Mach number within the range of 0.4 to 0.9.

BRIEF DESCRIPTION OF THE INVENTION

It is the principal object of the present invention to provide a propeller construction which is capable of achieving a maximization of the noise reduction (the reduction of the A-weighted overall sound pressure level) achieved by the propeller construction according to the invention disclosed in prior application Ser. No. 259,854.

A more particular object of the present invention is the provision, for the stated purpose, of a propeller construction which is characterized by an even number of unsymmetrically spaced propeller blades greater than four, i.e., at least six, which are arranged in pairs of longitudinally aligned blades intended to operate at speeds corresponding to a bladetip Mach number in the range of 0.4 to 0.9, with each such pair of blades being offset from each next adjacent pair of blades by a spacing angle the magnitude of which is between about 15° and 40° and is inversely related to the magnitude of the blade-tip Mach number.

In accordance with one embodiment of the present invention, the propeller construction includes six unsymmetrically spaced blades (i.e., not at a uniform 60° blade to blade spacing) which are divided into two circumferentially equidistantly spaced groups of three blades each, with the two groups of blades being located at opposite sides of the axis of rotation of the propeller, with each blade of each group being arranged radially of the axis of rotation and in longitudinal alignment (i.e., paired) with a corresponding one of the blades of the other group, and with the three blades in each group being offset from each other circumferentially of the axis of rotation by respective spacing angles in the range of about 15° to about 40°. Preferably, the two groups of three blades each are formed by a combination of three intersecting 2-bladed propellers providing the three pairs of opposite 180°-spaced blades, so that each spacing angle at one side of the axis of rotation is matched by an identical spacing angle at the other side of the axis. Within this concept, the two spacing angles $\epsilon_1$ and $\epsilon_2$ in each group preferably will be equal to each other, since calculations have shown that the very level minimum, i.e., the maximum noise reduction, in a 6-bladed propeller is achieved when in each group of three blades $\epsilon_1 = \epsilon_2$. The same would be true, for example, in a 12-bladed propeller with two groups of six propeller blades each. Nevertheless, it is also possible to achieve useful degrees of noise reduction very close to the maximum even when the two spacing angles are slightly different from one another. The term "substantially equal spacing angles" will thus be used herein to designate not only the condition of precise equality between the two spacing angles but also the mentioned condition of one spacing angle being slightly different than the other, e.g., up to ±10%.

It should be understood, in this regard, that in general an unsymmetrical blade spacing affects the frequency distribution of propeller rotational noise components. The physical background of this phenomenon is best described by imagining the sound pressure signal of a multibladed propeller with identical individual blade geometry as being generated by a successive superposition (phased-displaced according to the number of blades and the azimuthal blade position) of the sound pressure signal of each individual blade. By phase displacement in time (relative to the individual blade sound pressure signals as emitted during one rotation of the propeller), interference minima are produced in the sound pressure level spectrum. If such a displacement is appropriately adjusted, the first interference minimum coincides with the spectral maximum of the (A-weighted) spectrum of a reference propeller having a symmetrical blade spacing. The resulting noise reduction is limited, however, by the occurrence of subharmonics; such subharmonics, of course, correspond to the rotational frequency in case of a "randomly" unsymmetrical blade spacing. Unfortunately, such a design would be inherently unbalanced if assembled from a plurality of identical individual blades. It is to avoid such balancing problems and still be able to employ blades of identical shapes that the hereinbefore mentioned combination of conventional 2-bladed propellers is used.

It will further be understood that although in theory all the blades of a propeller according to the present invention could be secured to the same hub, as a practical matter this will not be feasible because the roots of the blades in each group of blades would be located too close each other and because undesired aerodynamic interactions between adjacent blades could occur. To avoid the space problem and to minimize such aerodynamic interactions, therefore, and thus to maintain the thrust- and power-capabilities of the propeller independent of any selected blade spacings, the various blade pairs are mounted on separate, axially separated hubs or hub sections in a fashion analogous to that disclosed in the prior application. The degree of noise reduction achieved by the arrangement of the present invention is, however, not substantially affected by the axial spacing of the propeller blade pairs.

BRIEF DESCRIPTION OF THE DRAWING

The invention is diagrammatically illustrated in and will be more clearly understood from the accompanying drawing, in which.

DESCRIPTION OF THE PREFERRED EMBODIMENT

Figure 1:
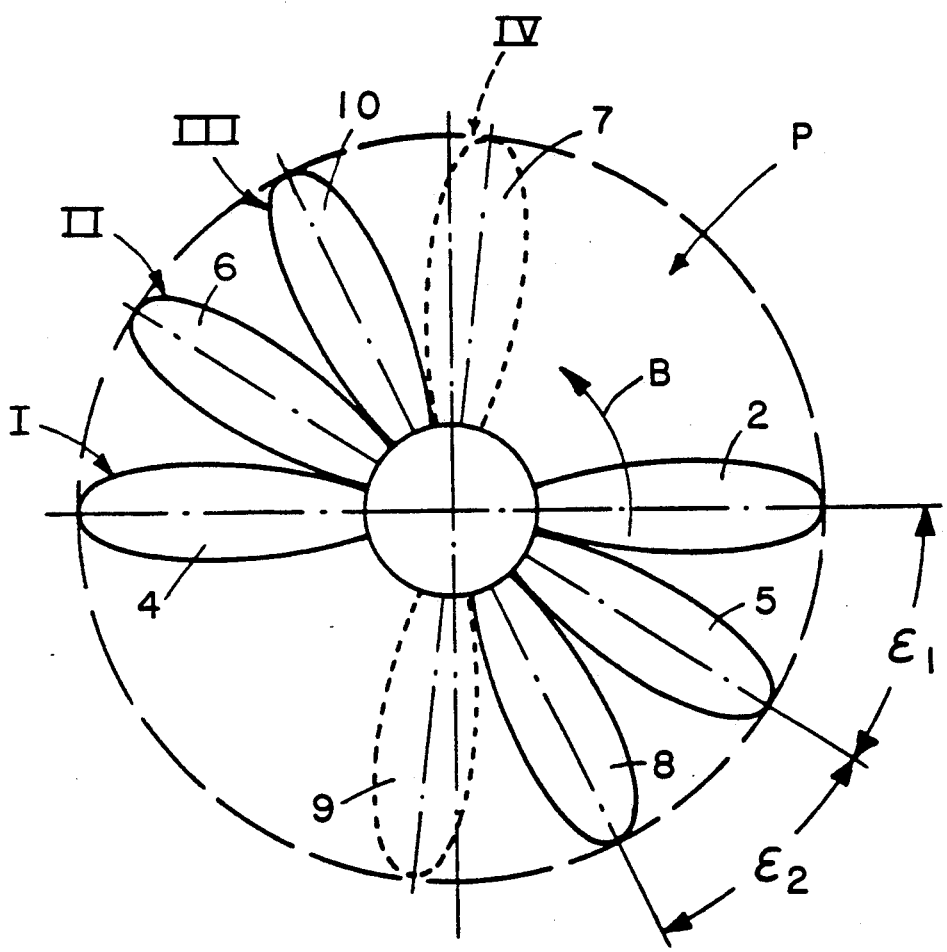
FIG. 1 schematically shows an aircraft propeller construction having six unsymmetrically spaced propeller blades according to one embodiment of the present invention, with each blade at one side of the axis of rotation being radially aligned with a corresponding blade at the other side of the axis.

Referring now to the drawing in greater detail, the 6-bladed propeller P shown in solid lines in FIG. 1 is constituted of three 2-bladed propellers I, II and III constituted of respective longitudinally aligned opposite pairs of propeller blades 2 and 4, 5 and 6, and 8 and 10, with each blade extending radially of the common axis of rotation A of the propeller. The individual 2-bladed propellers I, II and III are so arranged that the six blades are divided into two circumferentially equidistantly spaced groups of blades 2, 5, 8 and 4, 6, 10, with the adjacent propellers I, II and III and thus the adjacent blades within each group being spaced from one another by respective spacing angles $\epsilon_1$ and $\epsilon_2$ each of which is smaller than the 60° spacing angle that would exist between each two circumferentially adjacent blades in a symmetrical arrangement of the propeller blades. In the illustrated embodiment, the spacing angle $\epsilon_1$ is shown to be exactly equal to the spacing angle $\epsilon_2$, although based on calculations (see FIG. 5) to be more fully described hereinafter it is currently contemplated that acceptably good results in terms of noise level reduction will be achieved as long as the two spacing angles are substantially equal to each other (i.e., $\epsilon_1 = \epsilon_2 \pm 10\%$) within the range of about 15° to about 40°, depending on the blade-tip Mach number. In particular, the magnitude of the interblade spacing angle selected for the groups of three blades of any given propeller will be inversely related to the associated bladetip Mach number, so that the higher the blade-tip Mach number, the smaller will be the spacing angle, and vice versa. As in accordance with the prior invention, the spacing angle of the propeller according to the present invention is optimized in dependence on the blade-tip Mach number in such a fashion that the level of the rotational sound harmonics is reduced by interference. Reference may be had to prior application Ser. No. 259,854 for the procedure of determining the optimum value of the spacing angle.

The propeller P according to the present invention can, as mentioned, include more than six propeller blades or three pairs of such blades. Merely by way of example, this is diagrammatically indicated in FIG. 1 by a broken-line illustration of a fourth 2-bladed propeller IV which, like the propellers I–III, has an opposite pair of 180°-spaced longitudinally aligned propeller blades 7 and 9. Such a propeller thus has eight blades divided into two groups of four blades each with three spacing angles therebetween. As in the case of he arrangement illustrated in solid lines, all the spacing angles between the a propellers I–IV (i.e., between the circumferentially adjacent blades in each group) are preferably substantially equal to each other.

Figure 2:
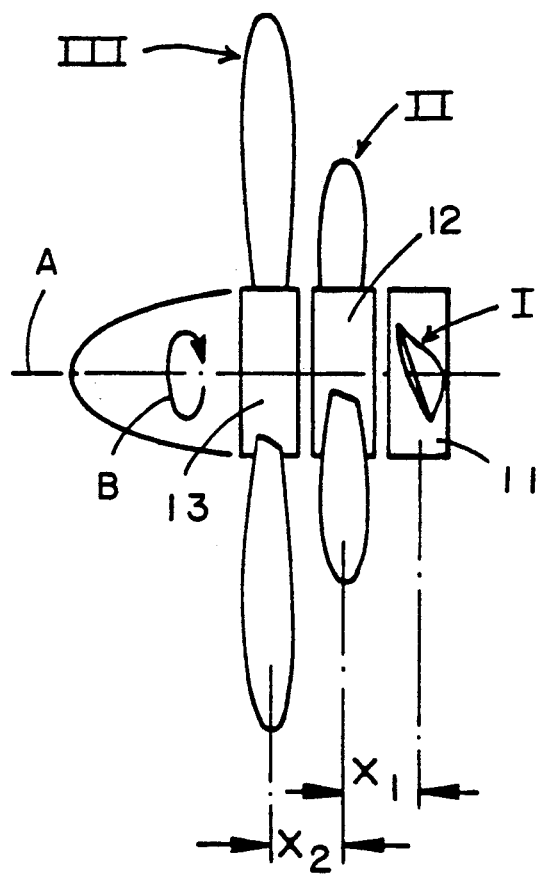
FIG. 2 is a side view of the propeller arrangement shown in FIG. 1 as seen from the right-hand side of FIG. 1 and schematically illustrates the axial separation of the three propeller blade pairs by mounting thereof on respective axially offset hub sections.
Figure 6:
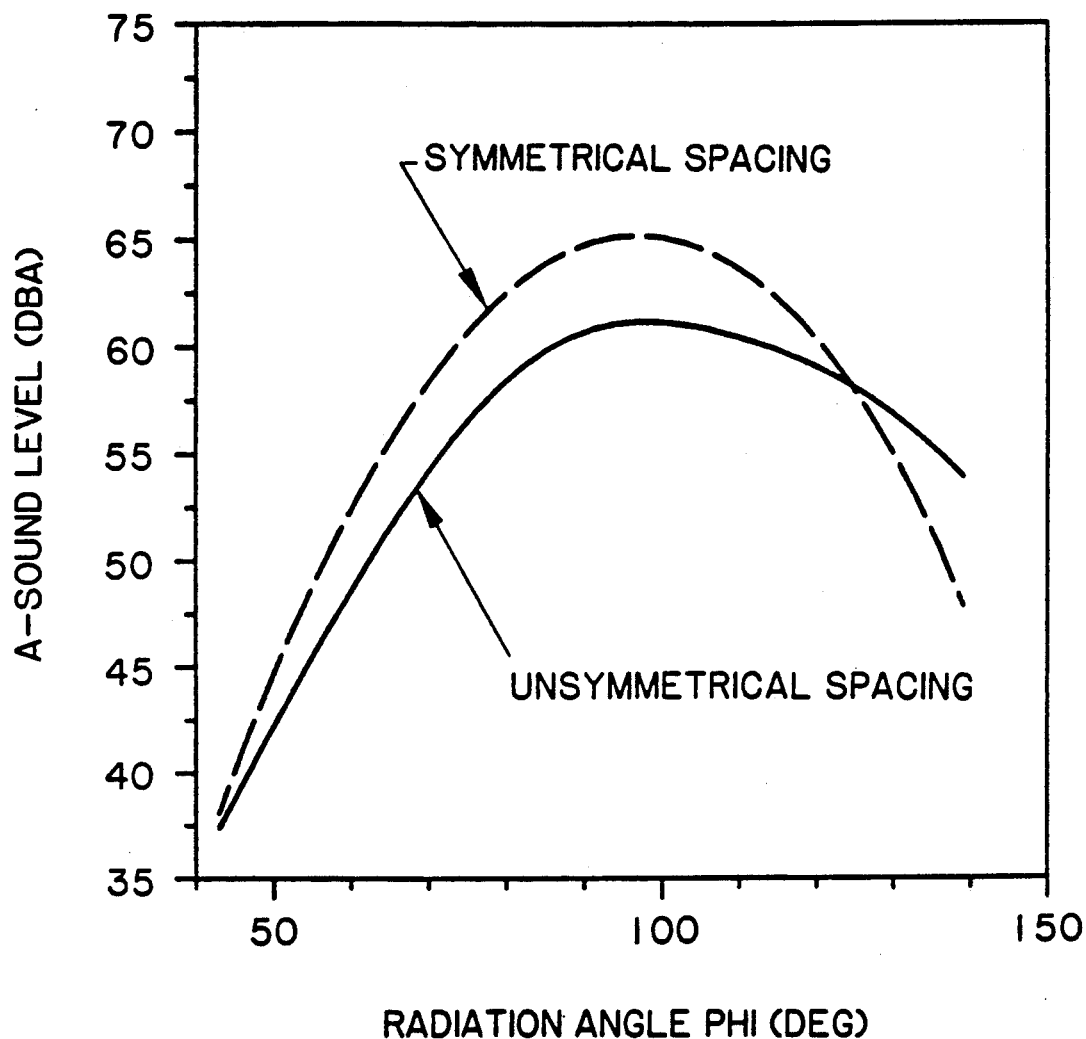
FIG. 6 is a graphical representation of the calculated relationship between the attainable A-sound level and the radiation angle of the sound for both a 6-bladed propeller with a symmetrical spacing between adjacent blades and a 6-bladed propeller with an unsymmetrical spacing of the blades, the calculations assuming a 3 m propeller diameter and a blade-tip Mach number of 0.7.

It should be noted, in regard to the foregoing, that especially in the case of propellers with more than four blades it becomes exceedingly difficult to arrange all of the blades of the propeller in a single plane of rotation. Principally, this is due to the fact that in a single plane the blade roots would be circumferentially so close to each other that construction problems and possibly also undesirable aerodynamic interactions could result. It is for this reason that the individual 2-bladed propellers I, II and III are mounted on respective hubs or hub sections 11, 12 and 13 which are axially offset from each other so as to dispose the respective planes of rotation of the blade pairs at axial spacings $x_1$ and $x_2$ from one another, as shown in FIG. 2. (For an 8-bladed propeller, of course, a corresponding fourth axially offset hub section or the like would be provided.) Such axial offset of the blades leads to an asymmetry of the directional characteristic or space pattern of the sound projection in the plane of the flight path, so that the interference-caused noise reduction in the direction of projection of the sound increases toward the front of the aircraft ($\phi < 90°$) but decreases in the direction of projection of the sound toward the back of the aircraft, i.e., the noise level is lower toward the front than toward the back. This effect is shown in FIG. 6 by the solid-line curve for the case of a 6-bladed propeller having a diameter D=3 m and a blade-tip Mach number MH=0.7 with a blade arrangement which is unsymmetrical ($\epsilon = 20°$) according to the present invention and by the broken-line curve for a like propeller with a symmetrical blade arrangement ($\epsilon = 60°$), and it can be readily seen that at any given point (value of $\phi$) in the range of 90°±30° the noise level produced by a propeller with an unsymmetrical blade spacing according to the present invention is appreciably lower than the noise level produced by a like propeller with a symmetrical blade spacing.

The magnitude of the axial spacing of the propellers I, II and III which, based on acoustic considerations, will be deemed acceptable in any given case will, of course, have to be individually calculated. In the illustrated embodiment of the invention, the noise level calculations were based on a propeller arrangement utilizing three 2-bladed propellers arranged at axial spacings $x_1$ and $x_2$ from one another, with $x_1 = x_2 = 0.12(D/2)$. The actual axial propeller spacings represented by FIG. 2 were selected subject to the condition that they must permit a structurally independent blade root mounting for each individual propeller. In this regard, the adjacent 2-bladed propellers are so arranged that of each group of three blades at either side of the axis of rotation, the blade which is disposed in the rearwardmost plane of rotation, here the blade 2 or 4, is the one which is leading as viewed in the direction of rotation (designated by the arrow B in FIG. 1). In this manner, undesirable blade interactions (blade wake interference) and resultant additional noise generation are avoided.

Figure 3:
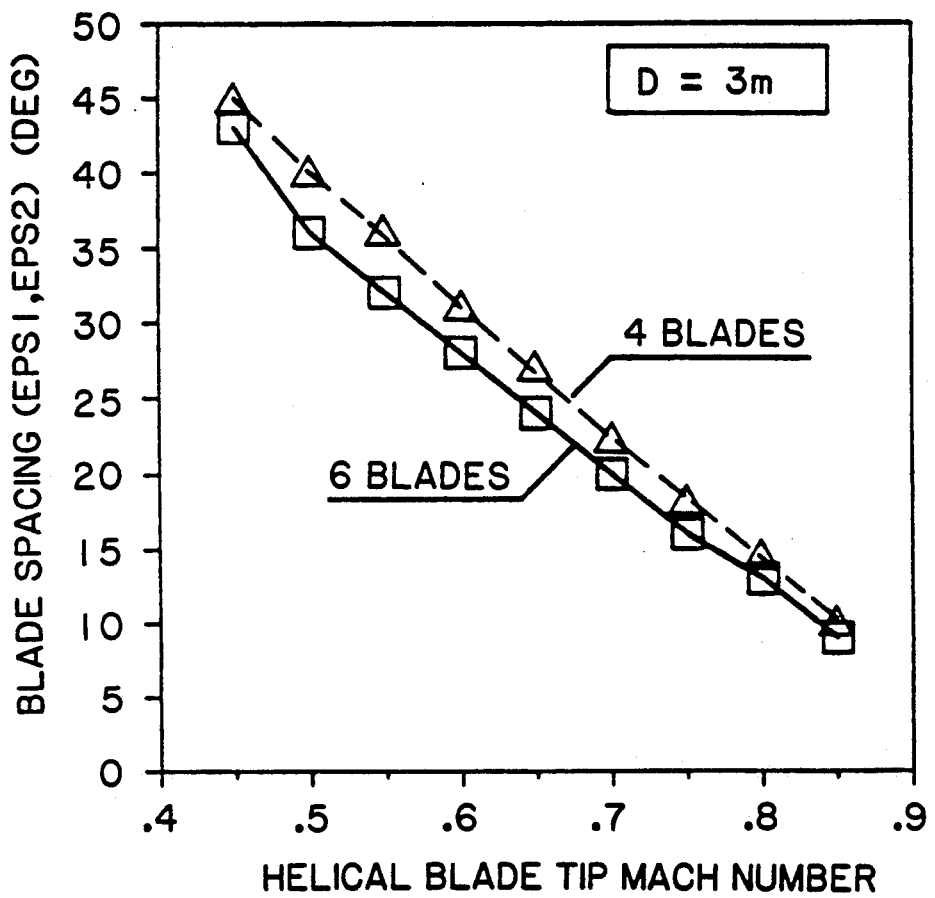
FIG. 3 is a graphical representation of the calculated inverse relationship between the interblade spacing angles in each group of blades and the blade-tip Mach number of a 6-bladed propeller of 3 m diameter according to the present invention, and for purposes of comparison also shows a plot of the Mach number/spacing relationship for an identically dimensioned 4-bladed propeller according to the prior invention having only a single spacing angle.

From calculations aimed at determining optimum parameters it is found that the magnitude of the spacing angle at which the A-sound level becomes minimal, decreases with an increasing blade-tip Mach number (in the range of 0.4 to 0.9). This is illustrated graphically in FIG. 3 for two propellers of identical diameter (D=3 m), one being a 6-bladed propeller according to the present invention for which the calculated points are drawn as squares, and the other being a 4-bladed propeller according to the prior invention for which the calculated points are drawn as triangles. From FIG. 3 it can be seen that the two plots of points, represented by a solid line and a broken line, respectively, run approximately parallel to one another. It follows, therefore, that within the range of blade-tip Mach numbers from 0.4 to 0.9, somewhat smaller blade spacing angles can be used in the 6-bladed propeller than in the 4-bladed propeller.

It should be noted here that the inverse relationship between the magnitude of the selected 15°–40° spacing angle and the magnitude of the associated 0.4°–0.9 blade-tip Mach number is valid also for larger numbers of propeller blades, e.g., for 8-bladed, 10-bladed or 12-bladed propellers (regular or turboprops). This is true, however, only as long as the blades are divided into two groups of more than two blades per group, and only if the spacing angle between adjacent blades in each group is smaller than what the spacing angle would be for a symmetrically spaced set of propeller blades; e.q., for a 10-bladed propeller the unsymmetrical blade to blade spacing angle in each group would have to be less than 36°.

Figure 4:
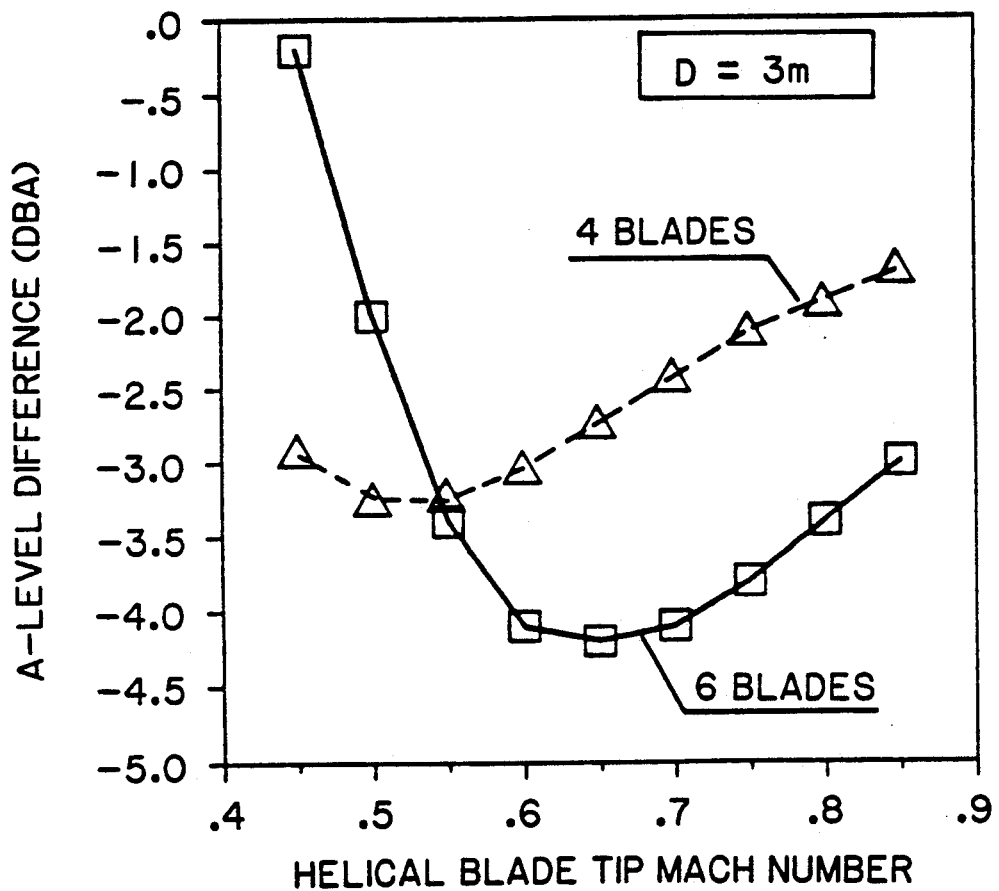
FIG. 4 is a graphical representation of the calculated relationship between the attainable A-sound level reduction and the blade-tip Mach number for a 6-bladed propeller of 3 m diameter according to the present invention, and for purposes of comparison also shows a plot of that relationship for an identically dimensioned 4-bladed propeller according to the prior invention and having only a single spacing angle.

A significant feature of the present invention is that, as one increases the number of propeller blades, the noise-reducing effect of the unsymmetrical propeller blade spacing angles becomes more pronounced as the blade-tip Mach number increases. This can best be visualized from a consideration of FIGS. 3 and 4, of which the latter represents plots, for the same 4-bladed and 6-bladed propellers mentioned in connection with FIG. 3, of the A-sound level reduction against blade-tip Mach number. Since the individual calculated points for the curves of FIG. 4 are the same as those for the curves of FIG. 3, it can be seen that in the case of the 4-bladed propeller with the blades arranged at a spacing angle of approximately 35°, rotation of the propeller at a blade-tip Mach number of approximately 0.55 enables an A-sound level reduction of approximately 3.3 dB(A) to be achieved, whereas in the case of the 6-bladed propeller with the blades arranged at a spacing angle of 24°, rotation of the propeller at a blade-tip Mach number of approximately 0.65 enables an A-sound level reduction of approximately 4.3 dB(A) to be achieved. In both types of propellers the A-sound level reduction becomes less in the case of deviations from the optimal combination of spacing angle and blade-tip Mach number.

Figure 5:
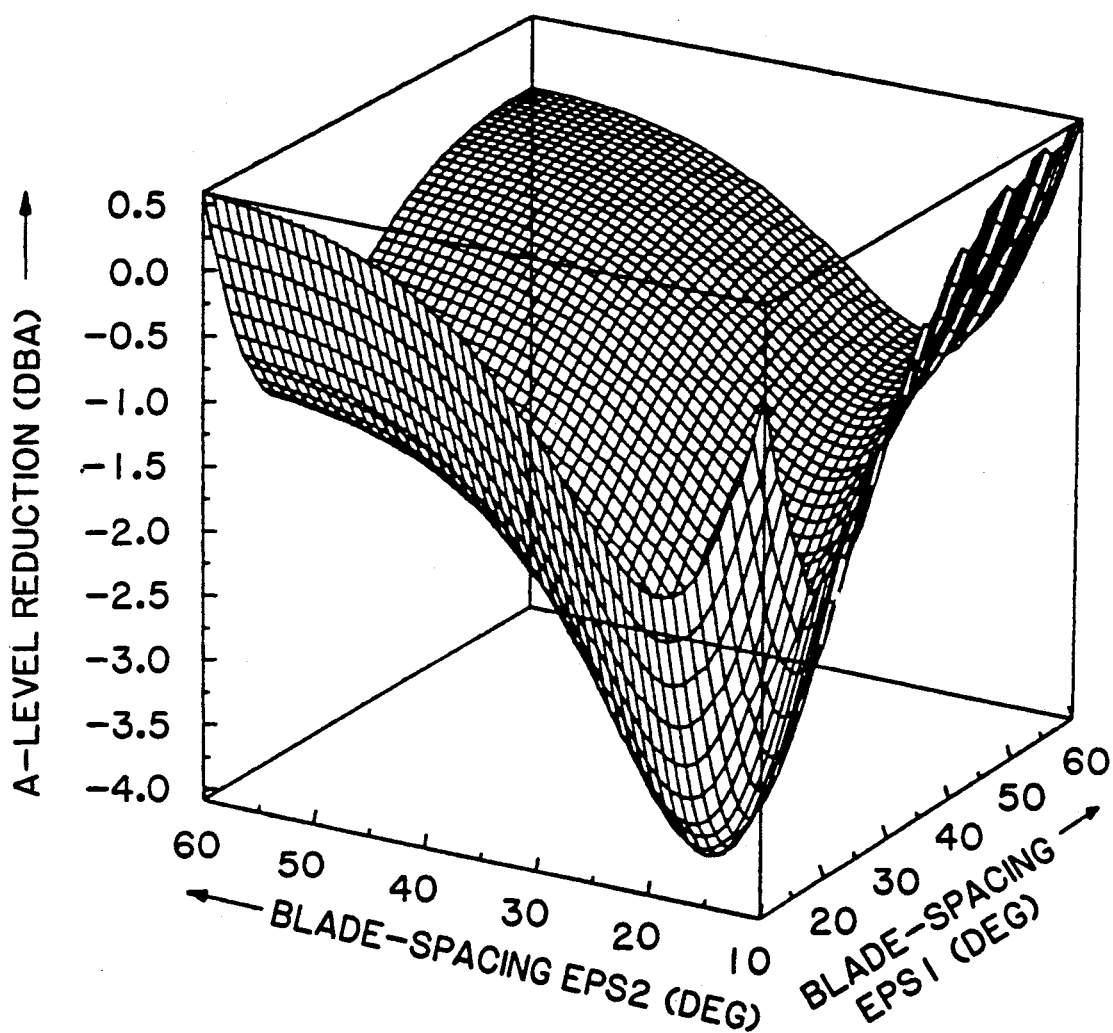
FIG. 5 is a three-dimensional diagram of calculated A-sound level reduction relative to the spacing angles between the adjacent blades in each group of three blades of a 6-bladed propeller according to the present invention, the calculations assuming a 3 m propeller diameter and a blade-tip Mach number of 0.7.

FIG. 5 graphically represents, in a three-dimensional diagram, a plot of the calculated A-sound level reduction for a 6-bladed propeller according to the present invention as a function of the spacing angles $\epsilon_1$ and $\epsilon_2$ shown in FIG. 1 over a range of 10° to 60°. The calculations assume a propeller diameter of 3 m and a blade-tip Mach number of 0.7. The calculated results were obtained by systematically varying the two independent blade spacing angles $\epsilon_1$ and $\epsilon_2$, and it was found, as can be deduced from FIG. 5, that the greatest A-sound level reduction is achieved at $\epsilon_1 = \epsilon_2 = 24°$.

It should be noted that all of the values set forth in the various graphs are based on noise calculations in the time-domain based on the "FfowcsWilliams/Hawkings" equation. Calculations were performed within the following regimes of parameters:

| Number of blades | BLN = 4 and 6 |
|---|---|
| Propeller diameter | D = 1.7 to 5.0 m |
| Helical blade-tip Mach number | MH = 0.45 to 0.85 |

Propeller rotational speeds are thus defined by the combination of MH and D. Blade pitch angles were adjusted to maintain a constant geometric blade angle of attack. Propeller blade geometry and all other geometrical and operational parameters were kept constant, as follows:

| Flight speed | V = 60 m/s |
|---|---|
| Radiation angle | $\phi$ = 90° = plane of rotation |
| Rotor spacing | x = 0.12(D/2) |

Insofar as the acoustic effect of the described noise reduction through interference is concerned, an arrangement of all the propellers in the same plane of rotation would be desirable if, as is usually the case, the sound level maximum occurs in the plane of rotation. Here it should be noted that since the various calculations described herein pertain to noise radiation in the plane of rotation of the propeller, the results are not affected by the axial rotor spacing. During an overflight of a propeller aircraft, however, the geometric relationships (the distance) between an observer on the ground and the geometric location of the propeller blades in the air change due to the motion of the aircraft, so that both before and after the overflight the interference-caused noise reductions, even in the case of a zero axial spacing, gradually diminish for radiation angles deviating ($\phi < 90°$ and $\phi > 90°$) from the plane of rotation ($\phi = 90°$ is equivalent to aircraft vertically above the observer), even to the point that a certain interference-caused noise increase can occur. This is, however, not a disadvantage, inasmuch as at that point in time the absolute value of the noise level has already dropped at least 10 dB below the maximum level.

It will be understood that the foregoing description of a preferred embodiment of the present invention is for purposes of illustration only, and that the various structural and operational features herein disclosed are susceptible to a number of modifications and changes none of which entails any departure from the spirit and scope of the present invention as defined in the hereto appended claims. In particular, it can be seen that the unsymmetrical propeller construction of the present invention, which has been found to function and produce results as described for all investigated parameter combinations (subject, of course, to $\epsilon_1$ being substantially equal to $\epsilon_2$ in the 15°–40° range and having a magnitude which is inversely related to the magnitude of the blade-tip Mach number in the 0.4–0.9 range), enables a noise level reduction to be achieved which is appreciably greater than that achieved by means of the propeller construction of the prior invention, even at the higher blade-tip Mach numbers in the stated range.

I claim:

1. A propeller having an even number of propeller blades which are at least six in number, said blades being mounted for rotation about a common axis and intended to be rotated at a speed corresponding to a blade-tip Mach number in the range of about 0.4 to 0.9, said blades being arranged in longitudinally aligned opposite pairs extending radially of said axis of rotation and defining two groups of at least three laterally adjacent blades each, said blade groups being spaced equidistantly from one another around said axis of rotation, the blades of each blade group being offset in relation to one another so as to define between each two adjacent blades in each blade group a spacing angle of between about 15° and 40°, and the magnitude of said spacing angle in each group for a selected propeller speed of rotation corresponding to a particular blade-tip Mach number being inversely related to the magnitude of said particular blade-tip Mach number, thereby to effect a reduction in the level of the rotational sound harmonics by interference.

2. A propeller according to claim 1, wherein the magnitudes of said spacing angles in each blade group are substantially equal to each other.

3. An aircraft propeller according to claim 1, wherein said opposite pairs of blades are arranged for rotation in separate planes of rotation spaced a short distance from one another along said axis of rotation.

4. An aircraft propeller according to claim 3, wherein of said at least three blades in each blade group, any blade which is located for rotation in a plane of rotation to the rear of the plane of rotation of a next adjacent blade is arranged to lead said next adjacent blade in the direction of rotation.

5. An aircraft having at least one propeller, said propeller having an even number of propeller blades which are at least six in number, said blades being mounted for rotation about a common axis and intended to be rotated at a speed corresponding to a blade-tip Mach number in the range of about 0.4 to 0.9, said blades being arranged in longitudinally aligned opposite pairs extending radially of said axis of rotation and defining two groups of at least three laterally adjacent blades each, said blade groups being spaced equidistantly from one another around said axis of rotation, the blades of each blade group being offset in relation to one another so as to define between each two adjacent blades in each blade group a spacing angle of between about 15° and 40°, and the magnitude of said spacing angle in each group for a selected propeller speed of rotation corresponding to a particular blade-tip Mach number being inversely related to the magnitude of said particular blade-tip Mach number, thereby to effect a reduction in the level of the rotational sound harmonics by interference.

6. A blower or fan having at least one propeller, said propeller having an even number of propeller blades which are at least six in number, said blades being mounted for rotation about a common axis and intended to be rotated at a speed corresponding to a blade-tip Mach number in the range of about 0.4 to 0.9, said blades being arranged in longitudinally aligned opposite pairs extending radially of said axis of rotation and defining two groups of at least three laterally adjacent blades each, said blade groups being spaced equidistantly from one another around said axis of rotation, the blades of each blade group being offset in relation to one another so as to define between each two adjacent blades in each blade group a spacing angle of between about 15° and 40°, and the magnitude of said spacing angle in each group for a selected propeller speed of rotation corresponding to a particular blade-tip Mach number being inversely related to the magnitude of said particular blade-tip Mach number, thereby to effect a reduction in the level of the rotational sound harmonics by interference.

* * * * *